(12) United States Patent
Paulus et al.

(10) Patent No.: US 8,883,100 B2
(45) Date of Patent: Nov. 11, 2014

(54) PARTICLE REDUCTION WITH COMBINED SCR AND NH3 SLIP CATALYST

(75) Inventors: Martin Paulus, Rosenheim (DE); Klaus Wanninger, Kolbermoor (DE)

(73) Assignee: Sued-Chemie IP GmbH & Co. KG, Munich (DE)

( * ) Notice: Subject to any disclaimer, the term of this patent is extended or adjusted under 35 U.S.C. 154(b) by 411 days.

(21) Appl. No.: 13/127,849

(22) PCT Filed: Nov. 4, 2009

(86) PCT No.: PCT/EP2009/007906
§ 371 (c)(1),
(2), (4) Date: Jun. 7, 2011

(87) PCT Pub. No.: WO2010/051983
PCT Pub. Date: May 14, 2010

(65) Prior Publication Data
US 2011/0229391 A1    Sep. 22, 2011

(30) Foreign Application Priority Data

Nov. 5, 2008    (DE) .......................... 10 2008 055 890

(51) Int. Cl.
*B01D 53/56* (2006.01)
*B01D 53/94* (2006.01)
(Continued)

(52) U.S. Cl.
CPC ................ *F01N 3/035* (2013.01); *B01J 23/42* (2013.01); *B01J 29/46* (2013.01);
(Continued)

(58) Field of Classification Search
USPC ............... 502/66, 73, 74, 258–263, 304, 305, 502/308, 309, 312, 313, 316, 326, 327, 502/332–334, 338, 339, 349–351, 355, 415, 502/439, 527.19, 527.24; 422/170–180; 423/213.2, 239.1
See application file for complete search history.

(56) References Cited

U.S. PATENT DOCUMENTS 4,849,399 A * 7/1989 Joy et al. ...................... 502/333
5,120,695 A    6/1992 Blumrich
(Continued)

FOREIGN PATENT DOCUMENTS

DE    3929297 A1    1/1991
DE    10335785 A1    3/2005
(Continued)

OTHER PUBLICATIONS

International Search Report for International Application No. PCT/EP2009/007906, issued Feb. 2, 2010.
(Continued)

*Primary Examiner* — Cam N. Nguyen
(74) *Attorney, Agent, or Firm* — Walter Ottesen P.A.

(57) ABSTRACT

The present invention relates to a particle filter comprising a porous carrier body, an SCR active component and an oxidation catalyst, wherein the SCR active component is present as coating on the exhaust-gas entry surface and the inner surface of the porous carrier body and the oxidation catalyst as coating on the exhaust-gas exit surface of the porous carrier body. According to the invention the oxidation catalyst changes its function depending on operating conditions. In normal operation it serves as $NH_3$ slip catalyst for oxidizing excess $NH_3$ and during filter regeneration it operates according to the 3-way principle for converting $NO_x$ and CO. The invention also relates to a method for producing the particle filter, the use of the particle filter for treating exhaust gases from the combustion of fossil, synthetic or biofuels as well as an exhaust-gas cleaning system which contains the particle filter according to the invention.

24 Claims, 1 Drawing Sheet

Figure 1:
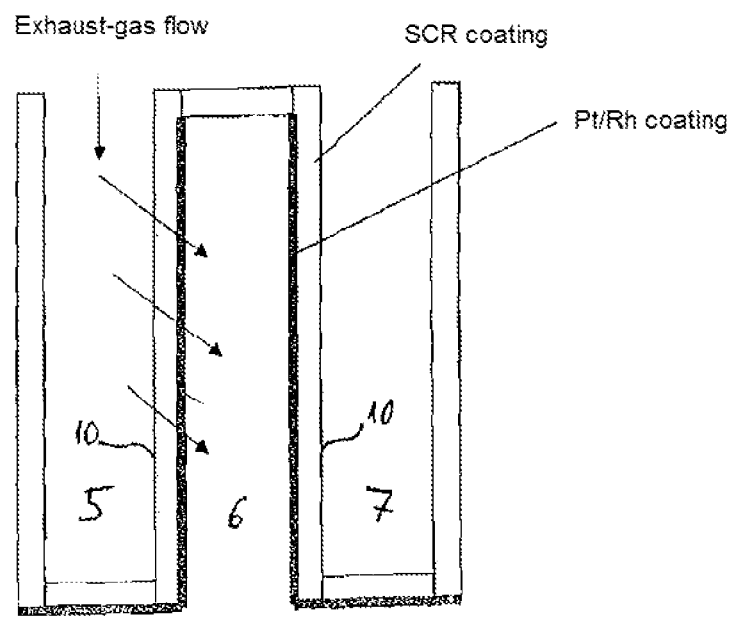

(51) Int. Cl.

| | | |
|---|---|---|
| *B01J 8/02* | (2006.01) | |
| *C01B 21/00* | (2006.01) | |
| *C01B 23/00* | (2006.01) | |
| *C01B 25/00* | (2006.01) | |
| *C01B 31/00* | (2006.01) | |
| *C01B 33/00* | (2006.01) | |
| *C01B 35/00* | (2006.01) | |
| *C01G 28/00* | (2006.01) | |
| *C01G 30/00* | (2006.01) | |
| *B01D 50/00* | (2006.01) | |
| *B01D 53/34* | (2006.01) | |
| *B01J 23/42* | (2006.01) | |
| *B01J 29/46* | (2006.01) | |
| *B01J 23/44* | (2006.01) | |
| *B01J 35/10* | (2006.01) | |
| *B01J 35/00* | (2006.01) | |
| *B01J 37/02* | (2006.01) | |
| *B01J 23/46* | (2006.01) | |
| *F01N 3/20* | (2006.01) | |
| *B01J 23/96* | (2006.01) | |
| *B01J 35/04* | (2006.01) | |
| *F01N 3/035* | (2006.01) | |
| *F01N 3/10* | (2006.01) | |
| *B01J 29/072* | (2006.01) | |
| *B01J 23/40* | (2006.01) | |

(52) U.S. Cl.
CPC . *B01D 2255/1021* (2013.01); *B01D 2255/9155* (2013.01); *B01J 23/44* (2013.01); *B01D 2255/504* (2013.01); *Y02T 10/24* (2013.01); *F01N 2250/02* (2013.01); *B01J 35/1076* (2013.01); *B01J 35/002* (2013.01); *B01D 2255/1025* (2013.01); *B01D 2258/012* (2013.01); *B01D 2325/10* (2013.01); *B01J 37/024* (2013.01); *B01D 53/944* (2013.01); *B01J 23/464* (2013.01); *B01J 37/0246* (2013.01); *F01N 3/2066* (2013.01); *B01J 23/96* (2013.01); *B01J 35/04* (2013.01); *F01N 2510/0682* (2013.01); *B01D 53/9418* (2013.01); *F01N 3/103* (2013.01); *B01D 2255/20738* (2013.01); *B01D 2251/2067* (2013.01); *B01D 53/9468* (2013.01); *B01J 29/072* (2013.01); *B01J 23/40* (2013.01); *Y10S 502/52719* (2013.01); *Y10S 502/52724* (2013.01)
USPC ............ 423/213.2; 423/239.1; 422/170; 422/177; 422/180; 502/66; 502/73; 502/74; 502/258; 502/259; 502/260; 502/261; 502/262; 502/263; 502/304; 502/305; 502/308; 502/309; 502/312; 502/313; 502/316; 502/326; 502/327; 502/332; 502/333; 502/334; 502/338; 502/339; 502/349; 502/350; 502/351; 502/355; 502/415; 502/439; 502/527.19; 502/527.24

(56) References Cited

U.S. PATENT DOCUMENTS

| | | | |
|---|---|---|---|
| 6,122,603 A * | 9/2000 | Budike, Jr. | 702/182 |
| 6,350,416 B2 * | 2/2002 | Noda et al. | 422/171 |
| 6,962,614 B2 * | 11/2005 | Katafuchi | 44/629 |
| 7,107,763 B2 * | 9/2006 | Suwabe et al. | 60/295 |
| 7,178,331 B2 * | 2/2007 | Blakeman et al. | 60/301 |
| 7,210,288 B2 * | 5/2007 | Bandl-Konrad et al. | 60/297 |
| 7,229,597 B2 * | 6/2007 | Patchett et al. | 422/177 |
| 7,332,454 B2 * | 2/2008 | Dang et al. | 502/60 |
| 7,431,749 B2 * | 10/2008 | Kim et al. | 55/523 |
| 7,431,895 B2 * | 10/2008 | Pfeifer et al. | 422/177 |
| 7,431,905 B2 * | 10/2008 | Hancu et al. | 423/213.2 |
| 7,465,690 B2 * | 12/2008 | Yan | 502/325 |
| 7,481,983 B2 * | 1/2009 | Patchett et al. | 422/180 |
| 7,560,079 B2 * | 7/2009 | Okawara | 422/180 |
| 7,655,203 B2 * | 2/2010 | Hancu et al. | 423/213.2 |
| 7,666,376 B2 * | 2/2010 | Dornseiffer et al. | 423/239.1 |
| 7,673,448 B2 * | 3/2010 | Voss et al. | 60/297 |
| 7,740,809 B2 * | 6/2010 | Suwabe et al. | 422/180 |
| 7,763,222 B2 * | 7/2010 | Miyairi et al. | 423/239.1 |
| 7,772,151 B2 * | 8/2010 | Li et al. | 502/339 |
| 7,814,747 B2 * | 10/2010 | Bandl-Konrad et al. | 60/297 |
| 7,977,275 B2 * | 7/2011 | Pfeifer et al. | 502/325 |
| 8,038,954 B2 * | 10/2011 | Li | 422/180 |
| 8,092,767 B2 * | 1/2012 | Pollington et al. | 423/213.2 |
| 8,105,542 B2 * | 1/2012 | Sato et al. | 422/170 |
| 2004/0175315 A1 | 9/2004 | Brisley et al. | |
| 2005/0239642 A1 * | 10/2005 | Kim et al. | 502/219 |
| 2006/0057046 A1 * | 3/2006 | Punke et al. | 423/215.5 |
| 2006/0211569 A1 * | 9/2006 | Dang et al. | 502/60 |
| 2008/0202107 A1 | 8/2008 | Boorse et al. | |
| 2009/0232714 A1 * | 9/2009 | Abe et al. | 422/180 |
| 2009/0304566 A1 | 12/2009 | Golden et al. | |

FOREIGN PATENT DOCUMENTS

| | | |
|---|---|---|
| DE | 102006038406 A1 | 2/2008 |
| EP | 1892396 | 2/2008 |
| EP | 1961933 | 8/2008 |
| EP | 2072773 | 6/2009 |
| JP | 2004-060494 | 2/2004 |
| WO | WO-01/12320 A1 | 2/2001 |
| WO | WO-2005016497 | 2/2005 |
| WO | WO-2008122023 | 10/2008 |
| WO | WO-2009093071 | 7/2009 |

OTHER PUBLICATIONS

English-language translation of the International Preliminary Report on Patentability for International Application No. PCT/EP2009/007906, issued May 5, 2011.

* cited by examiner

PARTICLE REDUCTION WITH COMBINED SCR AND NH3 SLIP CATALYST

CROSS REFERENCE TO RELATED APPLICATIONS

This application is a national phase of PCT/EP2009/007906, filed on Nov. 4, 2009, which claims priority to DE 10 2008 055 890.7, filed Nov. 5, 2008, the entire contents of all are hereby incorporated by reference.

The present invention relates to a particle filter comprising a porous carrier body, an SCR active component and an oxidation catalyst, wherein the SCR active component is present as coating on the exhaust-gas entry surface and the inner surface of the porous carrier body and the oxidation catalyst as coating on the exhaust-gas exit surface of the porous carrier body. The invention also relates to a method for producing the particle filter, the use of the particle filter for treating exhaust gases from the combustion of fossil, synthetic or biofuels as well as an exhaust-gas cleaning system which contains the particle filter according to the invention.

BACKGROUND OF THE INVENTION

An exhaust-gas system for diesel combustion engines generally consists of the following components:
  DOC for oxidizing hydrocarbons and as cold-start hydrocarbon reservoir;
  DPF for reducing particle emissions;
  optionally an H catalyst for urea treatment;
  SCR catalyst for reducing nitrogen oxides;
  barrier catalyst as ammonia oxidation catalyst.

By DOC (diesel oxidation catalyst) a person skilled in the art understands a catalyst which on the one hand acts as a cold-start hydrocarbon reservoir and in normal operation oxidizes unburnt hydrocarbons. The treatment of exhaust gases of diesel combustion engines with catalysts requires changes to the design of catalyst materials as, unlike a petrol engine, a diesel engine is always run with an excess of oxygen and the catalyst is thus never subjected to reductive conditions.

Particle filters (DPF, diesel particle filters) are used to filter out soot particles from the exhaust gas of combustion engines, specifically diesel engines, and thus to reduce their discharge into the atmosphere. Various filter designs, such as e.g. so-called "wall-flow filters" or filters made from ceramic or metal foams, are used. However, the real problem is not the filtration of the soot particles, but the regeneration of the filters used. Depending on the operation-governed composition of the particles, carbon black spontaneously combusts only at temperatures between 500° C. and 700° C. However, modern diesel engines e.g. generally reach these temperatures only at full load.

Therefore, additional supporting measures, for example for oxidizing the soot particles separated from the exhaust gas, are necessary. This can occur by adding additives or by a catalytic coating of the filters or catalysts. Exhaust-gas cleaning catalysts which have a high oxidation action, so that the particles can be combusted at a low temperature, are known from the state of the art. The surface of the filter chamber therefore often has a catalytically active coating to accelerate the combustion of the soot particles collected on the filter. The catalytically active coating oxidizes the nitrogen monoxide contained in the exhaust gas to nitrogen dioxide. The nitrogen dioxide formed then improves the oxidation of the deposited particles.

SCR ("selective catalytic reduction") denotes the selective catalytic reduction of nitrogen oxides from exhaust gases of combustion engines (and also power stations). Only the nitrogen oxides NO and $NO_2$ are selectively reduced with an SCR catalyst, wherein $NH_3$ (ammonia) is usually admixed for the reaction. Only the harmless substances water and nitrogen form as reaction product. The addition of ammonia as well in compressed-gas bottles is a safety risk for use in motor vehicles. Therefore precursor compounds of ammonia which are broken down in the exhaust-gas system of the vehicles accompanied by the formation of ammonia are customarily used. For example the use of AdBlue®, which is a 32.5% eutectic solution of urea in water, is known in this connection. Other ammonia sources are for example ammonium carbamate, ammonium formate or urea pellets. A hydrolysis catalyst (H cat) which generates $NH_3$ from the precursor substances is therefore often also used.

Ammonia must first be formed from urea before the actual SCR reaction. This occurs in two reaction steps which together are called hydrolysis reaction. Firstly, $NH_3$ and isocyanic acid are formed in a thermolysis reaction. Isocyanic acid is then reacted with water in the actual hydrolysis reaction to ammonia and carbon dioxide.

To avoid solid depositions it is necessary for the second reaction to take place sufficiently quickly by choosing suitable catalysts and sufficiently high temperatures (from 250° C.). Simultaneously, modern SCR reactors act as the hydrolysis catalyst.

The ammonia formed through thermohydrolysis reacts at the SCR catalyst according to the following equations:

$$4NO + 4NH_3 + O_2 \rightarrow 4N_2 + 6H_2O \tag{1}$$

$$NO + NO_2 + 2NH_3 \rightarrow 2N_2 + 3H_2O \tag{2}$$

$$6NO_2 + 8NH_3 \rightarrow 7N_2 + 12H_2O \tag{3}$$

At low temperatures (<300° C.) the conversion proceeds predominantly via reaction (2). For a good low-temperature conversion it is therefore necessary to set a $NO_2$:NO ratio of approximately 1:1. Under these conditions the reaction (2) can already take place at temperatures from 170-200° C.

The oxidation of NO to $NO_x$ takes place in an upstream oxidation catalyst which is necessary for an optimum degree of efficiency.

If more reductant is added than is converted during the reduction with $NO_x$, an undesired $NH_3$ slip may result. The $NH_3$ is removed in the state of the art by an additional oxidation catalyst behind the SCR catalyst. This barrier catalyst oxidizes any ammonia that may occur to $N_2$ and $H_2O$. It is also essential that the urea dose be applied carefully.

An important characterizing variable for SCR catalysis is the so-called feed ratio $\alpha$, defined as the molar ratio of added $NH_3$ to the $NO_x$ present in the exhaust gas. Under ideal operating conditions (no $NH_3$ slip, no secondary reactions, no $NH_3$ oxidation), $\alpha$ is directly proportional to the $NO_x$ reduction rate:

With $\alpha=1$ a one hundred per cent $NO_x$ reduction is theoretically achieved. In practical use a $NO_x$ reduction of 90% can be achieved in stationary and non-stationary operation with an $NH_3$ slip of <20 ppm.

With today's SCR catalysts a $NO_x$ conversion >50% is achieved by the upstream hydrolysis reaction only at temperatures of above approx. 250° C., optimum conversion rates are achieved in a temperature range of from 250-450° C.

The dosing strategy is very important in catalysts with large $NH_3$ storage capacity, as the $NH_3$ storage capacity of SCR catalysts of the state of the art typically falls as the temperature rises.

At present SCR catalysts based on titanium dioxide, vanadium pentaoxide and tungsten oxide are predominantly used both in the field of power stations and in the automobile field. The use of SCR catalysts based on zeolites is also known in the state of the art. However, in this case the zeolite acts only as SCR active component.

According to state of the art, a downstream ammonia barrier catalyst which oxidizes excess ammonia from the SCR catalyst is frequently also used, as ammonia is very harmful to health and the environment.

As can be seen, a modern exhaust-gas system comprises a large number of components which are usually integrated into the exhaust-gas stream on the base of the vehicle. As the space available there is limited, it would thus be desirable if the available space could be used more effectively.

Therefore, efforts have already been made in the state of the art to combine several catalyst functions in one component.

WO 2005/016497 A1 discloses to this end a combination of a particle filter with an SCR active component.

A filter substrate which is coated with a $NO_x$ storage component on the exhaust-gas entry side and with an SCR active component on the exhaust-gas exit side is disclosed in DE 10 335 785 A1.

WO 01/12320 A1 discloses a catalytic wall-flow filter which is coated with an oxidation catalyst for HC, CO and NO on the exhaust-gas entry side and with a $NO_x$ absorber and a $NO_x$ reduction catalyst on the exhaust-gas exit side. The filter substrate lying between them does not have a catalytic coating and serves only to filter particles. The same principle is disclosed in US 2004/0175315 A1. The principle of the CRT (continuous regeneration trap) is disclosed in both documents, wherein filter regeneration is not necessary.

With non-continuous systems in which a filter regeneration is periodically necessary, the formation of CO during the regeneration phase represents a problem. Soot is oxidized not only to $CO_2$ but partly also to CO. However, CO is an undesired component in exhaust gas.

A further problem of particle filters provided with SCR active components is that very high temperatures (up to 800° C.) occur during the regeneration phase of the filter. However, $NH_3$ breaks down from a temperature of approximately 630° C., even earlier in the presence of metal oxides. For this reason, the urea dosing must be interrupted during filter regeneration, whereby there is no conversion of the nitrogen oxides during the regeneration phase.

SUMMARY OF THE INVENTION

The object of the present invention was therefore to provide a particle filter in which several functions can be combined and which does not have the above-named disadvantages of the state of the art, i.e. CO and nitrogen oxides are not released during the regeneration phase.

The object was achieved by a particle filter comprising a porous carrier body, an SCR active component and an oxidation catalyst, wherein the SCR active component is present as coating on the exhaust-gas entry surface and the inner surface of the porous carrier body and the oxidation catalyst as coating on the exhaust-gas exit surface of the porous carrier body.

The oxidation catalyst preferably comprises platinum, rhodium and/or palladium on a metal oxide. Suitable metal oxides are for example aluminium oxide, silicon oxide, iron oxide, cerium oxide, titanium oxide, zirconium oxide or a mixed oxide of those named. In particular cerium oxide or a cerium/zirconium mixed oxide is preferred. The cerium oxide or cerium/zirconium mixed oxide can also act as a promoter.

The SCR active component preferably comprises an Fe zeolite, vanadium, tungsten, molybdenum and/or titanium. An Fe zeolite, in particular with a combination of Pt and Rh on $Al_2O_3$, is particularly preferred as oxidation catalyst, wherein Pt can be replaced by Pd. Advantageously the oxidation catalyst can also contain cerium oxide as promoter.

By "zeolite" is meant within the framework of the present invention according to the definition of the International Mineralogical Association (D. S Coombs et al., Canadian Mineralogist, 35, 1979, 1571) a crystalline substance from the group of aluminium silicates with a spatial network structure of the general formula

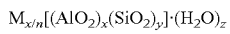

which is composed of $SiO_4/AlO_4$ tetrahedra which are linked by common oxygen atoms to form a regular three-dimensional network.

The Si/Al=y/x ratio is always>1 according to the so-called "Löwenstein rule" which prohibits the occurrence of two adjacent negatively charged $AlO_4$ tetrahedra. Although more exchange sites are available for metals with a small Si/Al atomic ratio, the zeolite increasingly becomes thermally more unstable.

The zeolite for the SCR active component is preferably selected from the group consisting of AEL, BEA, CHA, EUO, FAO, FER, KFI, LTA, LTL, MAZ, MOR, MEL, MTW, LEV, OFF, TON and MFI. The zeolite can also be present in the H form. A metal-exchanged zeolite can equally be used as SCR active component.

The Si/Al module is preferably greater than 5, particularly preferably greater than 10 and particularly preferably from 10 to 300.

The introduction of iron or other metals into the zeolite takes place according to methods known in the state of the art, for example by metal replacement in solution or by solid-state reactions.

In a preferred embodiment of the invention the particle filter is preferably designed as a wall-flow filter and comprises an open-pored porous material.

With a wall-flow filter (honeycomb, also called closed system), the soot particles added to the exhaust gas are filtered out as they penetrate a porous filter wall. With surface filters, the particles remain suspended from the surface of the filter wall or remain inside the filter wall by means of deep filtration. In both cases, however, it must be pointed out that the particles do not remain suspended by a sieve effect (thus the particles must not be larger than the holes through which the exhaust gas flows), but are mainly stuck to the porous wall by adhesion. A deep filtration takes place at the start also in the case of surface filters. The particles are deposited on the surface occupying the inner filter surfaces. A particle layer (the so-called filter cake) forms. With deep filters the particles settle only in the inner filter structure.

The filter walls, thus the porous carrier bodies themselves, can consist of different porous materials. The porous material is preferably an open-pored ceramic, an open-pored metal foam or a non-woven fabric. The open-pored ceramic is advantageously selected from the group consisting of cordierite, aluminium oxide, mullite, silicon carbide and zirconium.

The porous walls can be arranged in various ways in the filter. Preferably a duct structure is used, wherein the ducts are closed reciprocally. It is particularly preferred that the wall-flow filter is present in the form of a monolith with a large number of flow ducts, wherein part of the flow ducts are closed on the exhaust-gas entry side and part of the flow ducts are closed on the exhaust-gas exit side. The flow ducts can have a square, round, rectangular, hexagonal or triangular cross-section. The exhaust gas is forced to flow through the porous wall by the alternately closed duct structure.

The wall thickness of a duct of the porous wall is preferably from 0.5 to 2 mm, particularly preferably from 0.75 to 1.5 mm. The cell density is preferably from 200 to 1600 cpsi, particularly preferably from 400 to 800 cpsi. The cell density can be determined visually, for example with a laser measurement system. The average pore size lies in the range of from 5 to 50 μm, preferably 10 to 35 μm. The pore volume is approximately from 50 to 500 cm$^3$/g, preferably from 100 to 300 cm$^3$/g, particularly preferably from 150 to 250 cm$^3$/g. The pore size and pore volume are determined via a pore-volume impregnation using the mercury intrusion method according to DIN 66133.

As a result of the deposition of the particles on or in the inside of the surface of the filter wall, the differential pressure produced by the flow of the exhaust-gas volume above the filter increases. The filter regeneration is started when a threshold value is reached thus when a specific soot mass has been deposited.

In further preferred embodiments of the invention the oxidation catalyst is present as complete coating or as partial coating with a gradient on the exhaust-gas exit surface of the porous material of the wall-flow filter. Correspondingly, the SCR active component is present as coating on the exhaust-gas entry surface and on the inner surface of the porous material of the wall-flow filter.

In a wall-flow filter, the exhaust-gas entry surface is the surface at which the exhaust gas enters the porous carrier, wherein according to the invention the inner surface can also be included. The exhaust-gas exit surface is the surface where the exhaust gas leaves the porous carrier body.

In a further preferred embodiment of the invention the particle filter is designed as a through-flow filter.

The through-flow filter is preferably designed as metal or ceramic monolith with a large number of flow ducts. The flow ducts can have a square, round, rectangular, hexagonal or triangular cross-section.

Also, in the through-flow filter, the oxidation catalyst as coating is situated on the exhaust-gas exit surface of the through-flow filter and the SCR catalyst at the exhaust-gas entry surface of the through-flow filter. In a through-flow filter, the exhaust-gas entry surface is the surface at which the exhaust gas enters the flow duct, wherein according to the invention this also includes the porous inner surface of the flow duct. The exhaust-gas exit surface of the through-flow filter is the surface at which the exhaust gas leaves the flow duct, wherein according to the invention here too this includes the porous inner surface of the flow duct. The exhaust-gas exit surface comprises from 10 to 30% of the surface of the through-flow filter, preferably from 15 to 25%. Accordingly the exhaust-gas entry surface comprises from 70 to 90%, preferably from 75 to 85%, of the surface of the through-flow filter.

Common to all embodiments is that the oxidation catalyst is preferably applied by a zone-coating method.

The particle filter according to the invention is outstandingly suitable for treating exhaust gases from the combustion of fossil, synthetic or biofuels, in particular for treating exhaust gases from the combustion of diesel combustion fuel (diesel fuel).

The exhaust-gas treatment comprises a particle filtering with active regeneration, a selective catalytic reduction of $NO_x$ and an oxidation of $NH_3$ and optionally hydrocarbons and CO. The particle filtering takes place according to the invention at and in the porous wall of the particle filter (wall-flow filter, through-flow filter), where the SCR reaction also proceeds. In normal operation (outside the filter-regeneration phase), the oxidation catalyst on the exhaust-gas exit side converts $NH_3$ to nitrogen.

The temperature is increased by measures inside the engine during active filter regeneration. More fuel is injected and thus the engine is operated under "rich" conditions with a lack of oxygen. During regeneration, temperatures of up to 800° C. occur and therefore the urea dosing must be interrupted and $NO_x$ cannot be reduced "conventionally" by the SCR method.

It was surprisingly found that CO that formed during the filter-regeneration phase is oxidized to $CO_2$ by the oxidation catalyst at the exit side of the DPF and simultaneously $NO_x$ is reduced and thus the CO concentration could be reduced and simultaneously $NO_x$ emissions during the filter-regeneration phase. CO and $NO_x$ preferably react according to the following scheme:

$$2CO + 2NO \rightarrow 2CO_2 + N_2$$

alternatively: $4CO + 2NO_2 \rightarrow 4CO_2 + N_2$

A corresponding manner of operation is known from the 3-way catalyst in Otto engines. In other words, according to the invention the oxidation catalyst changes its function depending on operating conditions. In normal operation it serves as $NH_3$ slip catalyst for oxidizing excess $NH_3$ and during filter regeneration it operates according to the 3-way principle for converting $NO_x$ and CO.

A subject of the invention is also an exhaust-gas cleaning system comprising a diesel oxidation catalyst and a particle filter according to the invention. It is also preferred that the exhaust-gas cleaning system comprises a urea dosing device. This also includes other systems known in the state of the art for supplying ammonia or its precursors. The urea dosing device is expediently arranged between the diesel oxidation catalyst and the particle filter. It is also advantageous if the exhaust-gas cleaning system comprises a urea hydrolysis catalyst for converting ammonia precursors into ammonia.

A further subject of the invention is a method for producing the particle filter according to the invention, wherein the method comprises the steps of a) providing a porous carrier body,
b) coating the porous carrier body with an SCR active component,
c) coating the exhaust-gas exit surface of the carrier body with an oxidation catalyst.

Preferably, the particle filter is designed as a wall-flow filter or as a through-flow filter.

The porous carrier body is coated with the SCR active component by applying a washcoat, by which is customarily meant mostly aqueous suspensions of solids, containing the SCR active component. The washcoat is applied by methods known in the state of the art, for example by simple methods such as dipping the catalyst support into the washcoat and removing excess washcoat by blowing out with air, and also by coating methods using centrifuges. Likewise there is also the possibility of spraying porous shaped bodies with the washcoat. Mostly, aluminium oxide-based washcoats which are characterized by their large surface area are generally used as coating.

According to the invention the carrier body is coated with the oxidation catalyst over the entire exhaust-gas exit surface or part of the exhaust-gas exit surface, with or without a gradient. By gradient is meant that the layer thickness and/or the noble-metal concentration increase in the direction of the exhaust-gas exit side. The exhaust-gas exit surface of the carrier body is coated with the oxidation catalyst preferably via a zone-coating method.

Zone-coating methods are essentially based on a dipping method in which the corresponding honeycomb body is dipped only partly into the coating suspension or solution. Gradients can additionally be produced by the type of dipping step.

Alternatively, the oxidation catalyst can also be applied as washcoat. In the washcoat based on, for example, aluminium oxide, metals, such as the metals of the platinum group, are integrated e.g. by solution, total absorption or by steeping in noble metal-containing solutions or by working-in into the washcoat before the coating.

The surface area available for particle oxidation has a considerable influence on the catalytic conversion and in particular on the long-term stability of the catalyst. Stabilizing elements, such as e.g. cerium or lanthanum, can be admixed to increase the stability of the aluminium oxide surface or generally the metal oxide surface of the washcoat.

The washcoat is dried and/or calcined after coating with the SCR active component and the oxidation catalyst. Drying takes place at approximately from 100 to 200° C. Calcining takes place at from 200 to 800° C., preferably from 250 to 650° C.

The invention is now described in more detail with the help of embodiment examples, to be considered as not limiting the scope of the invention, with reference to the Figures.

EMBODIMENT EXAMPLES

Example 1

FIG. 1 shows a schematic representation of a diesel particle filter, designed as wall-flow filter with three adjacent flow ducts 5, 6, 7. A monolithic cordierite support with 600 cpsi and an approximate pore diameter of 10 μm serves as carrier body. Duct 6 is closed in the direction of the exhaust-gas entry side and the ducts 5 and 7 are closed in the direction of the exhaust-gas exit side. The porous carrier body is coated with an ZSM-5 type Fe zeolite on the exhaust-gas entry surface 10 and the inner surface of the porous cordierite monolith. The exhaust-gas exit surface 9 has a Pt/Rh coating which is distributed over the entire exhaust-gas exit surface. The engine-combustion exhaust gas enters the ducts 5 and 7 and, as these are closed at the end, is forced to flow through the cordierite support coated with an SCR active component into the flow duct 6. In the process the SCR reaction takes place. Upon exiting the cordierite support the treated exhaust gas strikes the platinum/rhodium coating, wherein unreacted $NH_3$ from the SCR reaction is oxidized to nitrogen (in the presence of oxygen).

Excess $NH_3$ in normal operation is oxidized to nitrogen by the oxidation catalyst in the presence of oxygen.

During the regeneration phase the CO produced by particle oxidation reacts with NO present to form nitrogen and additionally water, wherein non-consumed CO is oxidized to harmless $CO_2$ by the oxidation catalyst located in the exhaust-gas exit area.

Example 2

Figure 2:
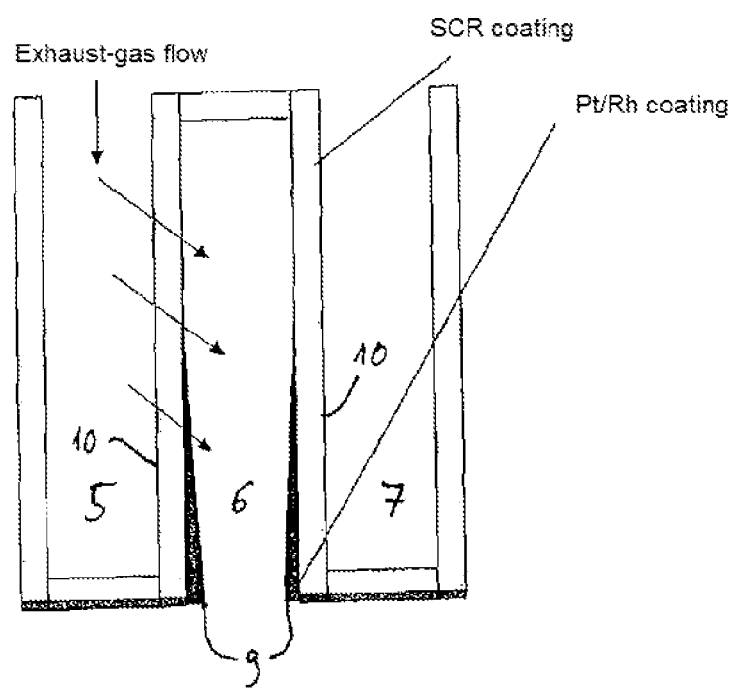

FIG. 2 shows an analogous particle filter comprising a cordierite monolith with 600 cpsi and a pore diameter of approximately 10 μm. Here, too, the ducts 5 and 7 are closed in the direction of the areas facing the exhaust-gas exit side and the duct 6 closed in the direction of the side facing the exhaust-gas entry side. Here, too, the exhaust gas is forced through the cordierite support coated with an SCR active component (ZSM-5 type Fe zeolite) to flow through the porous wall. The catalytic SCR reaction again takes place there. A Pt/Rh coating, however, present only as partial coating and also with a gradient, is located on the exhaust-gas exit surface 9. In other words, the layer thickness and thus the noble-metal charge increase in the direction of the exhaust-gas exit side. With this catalyst system also, an adequate conversion of $NO_x$ to $N_2$ is achieved by the SCR active coating.

Excess $NH_3$ in normal operation is likewise oxidized to nitrogen by the oxidation catalyst in the presence of oxygen.

During the regeneration phase the CO produced by particle oxidation likewise reacts with NO present to nitrogen and additionally water, wherein non-consumed CO is oxidized to harmless $CO_2$ by the oxidation catalyst located in the exhaust-gas exit area.

The catalyst arrangement according to the invention of a DPF with an SCR catalyst and an integrated oxidation catalyst in combination with active regeneration is thus capable on the one hand of improving the problem of space with an exhaust system of a vehicle and also of eliminating the problems, named at the start, of CO and $NO_x$ formation during the regeneration phase of the particle filter.

The invention claimed is:

1. Particle filter comprising a porous carrier body, an SCR active component and an oxidation catalyst,
   wherein the SCR active component is present as coating on the exhaust-gas entry surface and the inner surface of the porous carrier body and the oxidation catalyst is present as partial coating with a gradient on the exhaust-gas exit surface of the porous carrier body, and
   wherein the particle filter is designed as a wall-flow filter and comprises an open-pored porous material.

2. Particle filter according to claim 1, wherein, in normal operation, the oxidation catalyst oxidizes $NH_3$ and during filter regeneration operates according to a 3-way principle for converting $NO_x$ and CO, known from the 3-way catalyst in Otto-engines.

3. Particle filter according to claim 1, wherein the oxidation catalyst comprises platinum, rhodium and/or palladium on a metal oxide.

4. Particle filter according to claim 3, wherein the metal oxide is aluminium oxide, silicon oxide, iron oxide, cerium oxide, titanium oxide, zirconium oxide or a mixed oxide thereof.

5. Particle filter according to claim 1, wherein the SCR active component comprises an Fe zeolite, vanadium, tungsten, molybdenum and/or titanium.

6. Particle filter according to claim 5, wherein the zeolite is selected from the group consisting of AEL, BEA, CHA, EUO, FAO, FER, KFI, LTA, LTL, MAZ, MOR, MEL, MTW, LEV, OFF, TON and MFI.

7. Particle filter according to claim 1, wherein the open-pored porous material is an open-pored ceramic, an open-pored metal foam or a non-woven fabric.

8. Particle filter according to claim 7, wherein the open-pored ceramic is selected from the group consisting of cordierite, aluminium oxide, mullite, silicon carbide and zirconium.

9. Particle filter according to claim 1, wherein the wall-flow filter is present in the form of a monolith with a large number of flow ducts, wherein part of the flow ducts are closed on the exhaust-gas entry side and part of the flow ducts are closed on the exhaust-gas exit side.

10. Particle filter according to claim 9, wherein the flow ducts have a square, round, rectangular, hexagonal or triangular cross-section.

11. Particle filter according to claim 1, wherein the oxidation catalyst is applied by a zone-coating method.

12. Method of treating exhaust gases from the combustion of fossil, synthetic or biofuels, comprising treating the exhaust gases with a particle filter according to claim 1.

13. Method according to claim 12, wherein the exhaust gases from the combustion of diesel combustion fuel are treated.

14. Method according to claim 12, wherein the exhaust-gas treatment comprises a particle filtering with active regeneration, a selective catalytic reduction of NOx and an oxidation of $NH_3$ and/or hydrocarbons.

15. Exhaust-gas cleaning system comprising a diesel oxidation catalyst and a particle filter according to claim 1.

16. Exhaust-gas cleaning system according to claim 15, comprising a urea dosing device.

17. Exhaust-gas cleaning system according to claim 15, wherein the urea dosing device is arranged between the diesel oxidation catalyst and the particle filter.

18. Exhaust-gas cleaning system according to claim 15, comprising a urea hydrolysis catalyst.

19. Method for producing a particle filter according to claim 1, comprising:
   a) providing a porous carrier body,
   b) coating the porous carrier body with an SCR active component, and
   c) coating the exhaust-gas exit surface of the carrier body with an oxidation catalyst.

20. Method according to claim 19, wherein the carrier body is coated with the oxidation catalyst over the entire exhaust-gas exit surface or one part of the exhaust-gas exit surface, with or without a gradient.

21. Method according to claim 19, wherein the exhaust-gas exit surface of the carrier body is coated with the oxidation catalyst via a zone-coating method.

22. Method according to claim 19, wherein the particle filter is designed as a wall-flow filter.

23. Method according to claim 19, wherein the porous carrier body is coated with the SCR active component by applying a washcoat containing the SCR active component.

24. Method according to claim 23, wherein the washcoat is dried and/or calcined after coating with the SCR active component and the oxidation catalyst.

* * * * *